July 6, 1965  F. STÜMPFIG  3,192,912
INTERNAL COMBUSTION ENGINE CONSTRUCTION AND METHOD
Filed April 10, 1961  3 Sheets-Sheet 1

Inventor:
FRIEDRICH STÜMPFIG
McGlew and Toren
ATTORNEYS

3,192,912
INTERNAL COMBUSTION ENGINE CONSTRUCTION AND METHOD
Friedrich Stümpfig, Bismarckstrasse 31, Nurnberg, Germany
Filed Apr. 10, 1961, Ser. No. 102,041
Claims priority, application Germany, Apr. 14, 1960, St 16,361
23 Claims. (Cl. 123—30)

This invention relates in general to internal combustion engine cylinder head construction and to a method of operating such engine and in particular to a new and useful cylinder head construction including an evaporation chamber formed at the upper end of the cylinder and means for directing fuel and/or a fuel and air mixture into the evaporation chamber to effect evaporation of the fuel before ignition occurs.

The present invention is concerned with improvements in cylinder head construction and method of operating internal combustion engines to effect improved ignition and combustion conditions.

Prior to the present invention, it has been known to provide separate ignition chambers in order to provide for better mixing of the fuel and air and atomizing of the fuel to achieve better combustion characteristics. In the prior art constructions, it was extremely difficult to insure complete atomization and burning of the fuel, and further to insure that solid fuel particles were not introduced into the cylinder at locations where the fuel was apt to carbonize and form harmful deposits therein. In those constructions, in which attempts were made to vaporize the fuel before ignition, the structures and the methods provided effected fuel vaporization at a slow rate and to an incomplete extent, especially during the high operating speeds of the engine. This was particularly acute in the case of operation when fuel was at very high boiling temperatures. In many instances, the prior art engine cylinder head constructions operated with fuel ignition failure during low output of the engine where there is insufficient air in the fuel and air mixture to provide for a high compression of the air. Unless the atomized fuel is drawn together with the air into the vaporization location within the cylinder, considerable quantities of fuel will remain in suspension in the air and arrive at a location for ignition without being vaporized.

In general, the prior art constructions were deficient in the vaporization of the fuel and the intermixing of the fuel with the air for proper and complete combustion. This resulted in rapid engine wear due to the high carbon deposits and engine knocking. In addition, the engines operate with a toxic exhaust containing many exhaust constituents which are the result of incomplete combustion. In view of the incomplete combustion, the fuel consumption of such engines was great.

In accordance with the present invention, there is provided a cylinder and head construction which includes means defining a vaporization chamber which is normally maintained at high temperatures due to the operation of the engine and against which is directed a primary fuel and air mixture. The construction includes means for compressing additional air for combustion purposes within another portion of the cylinder while the fuel air mixture is advantageously directed against a wall under a whirling centrifugal force. Due to the high temperature of the wall, the fuel is vaporized into the entrained air and in the event that for some reason full vaporization does not immediately occur, solid fuel particles tend to remain in the chamber until such vaporization does occur.

In accordance with a preferred arrangement of the invention, the vapor chamber is formed by a member defining a curved pocket which includes an inner peripheral opening which is completely or partially cut off by an upwardly moving piston during the compression stroke to insure vaporization of the fuel in the vaporization chamber before it is directed into the remaining portion of the cylinder.

In an improved construction, the vaporization or evaporation chamber is open at each end of its curved length and it is always in communication with the remaining portion of the cylinder at such end locations. The cylinder construction further advantageously includes a separate upper chamber for the pre-compression of combustion air which does not contain any fuel entrained therein. The operation is such that when the fuel is directed into the evaporation chamber it is atomized by the centrifugal force and vaporized due to the high temperatures existing in the chamber. The upwardly moving piston compresses and further pressurizes the fuel and air mixture within the evaporation chamber and further compresses independently air which does not have a content of fuel. Ignition takes place within the evaporation chamber either independently as a result of the compression within the cylinder, or by the aid of a spark ignition, and the flame exits in circumferential directions at each side of the evaporation chamber. The piston then moves downwardly to uncover an intermediate opening between the vaporization chamber and the main cylinder and it permits spreading of the fuel and air mixture and the flame into the space containing the compressed combustion air, whereupon further intermixing occurs and the complete combustion proceeds during the downward movement of the piston uniformly and with the burning of all the products of combustion.

The primary feature of the present invention is the introduction of the fuel into a vaporization chamber while the combustion air is introduced into a cylinder space. There are many embodiments for carrying out the invention, including embodiments for operation with two stroke or four stroke cycle engine constructions. By forcing the fuel against a heated wall of the pre-combustion chamber, the fuel is brought to a state of vaporization. The air which is supplied to the cylinder space partly advances into the pre-compression chamber space and is compressed here in the upper portion of the cylinder head. The evaporation chamber and the air compression space are in at least partial communication so that the vaporized fuel is mixed with the air, the fuel-rich portion being pushed together with the air-rich portion in a direction toward the ignition means or to the location where ignition is to occur. The arrangement is such that in the location where ignition is to be brought about, such as by a spark plug, it is insured that the mixture at such locations will be rich in fuel permitting rapid and easy combustion. The construction further insures that fuel, lean or pure air will not be directed toward the location of the ignition so that it does not have any deleterious effects on such ignition.

Toward the end of the ensuing compression caused by the upward movement of the piston, the fuel vapor air mix produced in the vaporization chamber is ignited and, subsequently, while the piston is still in its upper position, the burning mixture is guided as a fire stream in a relatively thin layer formation and at great velocity over an even path, out of the vaporization chamber and into the air compression chamber.

In accordance with one embodiment of the invention, the evaporation chamber is formed by a semi-annular pocket member and baffle means are provided to direct the fuel-rich mixture into the pocket in a tangential direction against the hot wall thereof. Deflection means are advantageously provided in the vicinity of the spark plug in the case of an Otto cycle engine to cause impinging of the solid fuel thereon, in the event that the fuel is not fully vaporized by the hot wall of the vaporization chamber.

In accordance with another embodiment of the invention, the fuel is injected into the inlet air stream directly above the inlet valve and thence directed peripherally into the evaporation chamber formed by a pocket member having an interior central opening which is closed by the upward movement of the piston.

In still another embodiment of the invention, the vaporization chamber is formed to provide a semi-annular pocket for receiving the fuel-rich mixture and a spark plug is offset in the cylinder at a location either intermediate the length of the pocket member or at one end thereof. In order to insure that incoming fuel-free air does not reach the vicinity of the spark plug before the vaporized fuel, a suitable baffle plate is formed on the pocket member.

In accordance with a further feature of the invention, the cylinder head and piston are constructed for two cycle operation with an exhaust port on one side and an inlet port for fuel and air on the opposite side which are uncovered upon downward movement of the piston. In this construction, the piston is especially configured to form an evaporation chamber against which the fuel-rich mixture is directed. The combustion air which is free of fuel is directed upwardly in the cylinder, and in some instances may function for scavenging purposes when the exhaust port is uncovered and hence no fuel is lost out the exhaust port. The upper portion of the cylinder advantageously includes a compression chamber for the fuel-free air, whereas the fuel-rich mixture is constrained within the evaporation chamber to effect complete evaporation of the fuel before it comes into contact with a spark plug which is located at the upper end of the cylinder. The evaporation chamber formed in the piston advantageously forms a recess which cooperates with the upper head portion of the cylinder which contains the spark plug. Various means are provided for insuring a fuel-rich mixture being directed into the evaporation chamber portion and this may, in some instances, include a fuel injection pump.

Accordingly, it is an object of this invention to provide an improved cylinder and head construction including an evaporation chamber and means for directing fuel into the evaporation chamber for vaporization of the fuel prior to its complete mixing with the remaining combustion air.

A further object of the invention is to provide a cylinder and head construction including a semi-annular C-section pocket member formed at one side of the cylinder at the upper end thereof and including means for directing fuel into the pocket member for the vaporization thereof.

A further object of the invention is to provide a cylinder head, piston head and cylinder construction, including a semi-annular pocket member extending into the cylinder at the upper end thereof and having an inner peripheral opening, and a piston member having a recess complementary to the pocket member and with an upright ledge portion at the inner edge of said piston which effectively closes off the intermediate opening of the pocket member upon upward movement of the piston, and means for directing fuel into said pocket member.

A further object of the invention is to provide a cylinder head construction including a vaporization chamber, means for directing fuel into said vaporization chamber for vaporization thereof, and ignition means disposed in said vaporization chamber at a location to contact the fuel as it is vaporized for ignition purposes.

A further object of the invention is to provide an improved internal combustion engine construction including a vaporization chamber formed in a piston head and means for directing fuel or fuel air mixture into said vaporization chamber for the vaporization thereof, and means disposed in a location above the vaporization chamber of the piston for causing ignition of the fuel.

A further object of the invention is to provide an internal combustion engine which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Referring to the drawings in particular, the invention embodied therein includes in FIGS. 1 to 4 the four stroke cycle engine generally designated 10 having the double wall cylinder 12 which is covered by a cylinder head member generally designated 14. A carburetor generally designated 16 is secured to the head and it includes an inlet opening 18 for fuel-free combustion air at one side and carries a conduit $z$ with a carburetor portion $o$ for mixing air from an inlet 20 with fuel supplied through a conduit 22. The entire carburetor arrangement 16 feeds through a cylindrical inlet opening 23 which is cyclically opened and closed by reciprocation of a valve member $e$. The outlet valve is diagrammatically indicated at $g$ in FIG. 2.

Figures 1, 3:
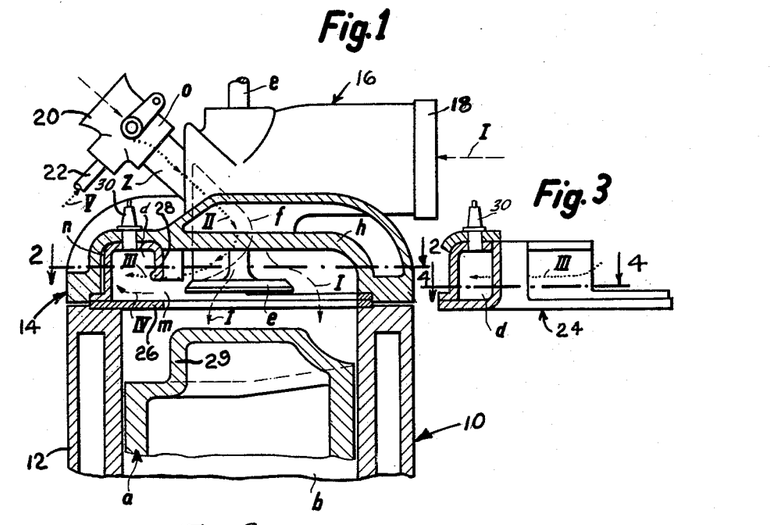
FIG. 1 is a longitudinal section of a cylinder head and piston constructed in accordance with the invention.
FIG. 3 is a fragmentary partial section and partial elevation of a modification of the pocket member forming the vaporization chamber.

The head, generally designated 14, advantageously includes an interior portion on one side which communicates with a hollow upper chamber or air compression space $h$ formed in the upper portion of the head.

Figures 2, 4, 14A:
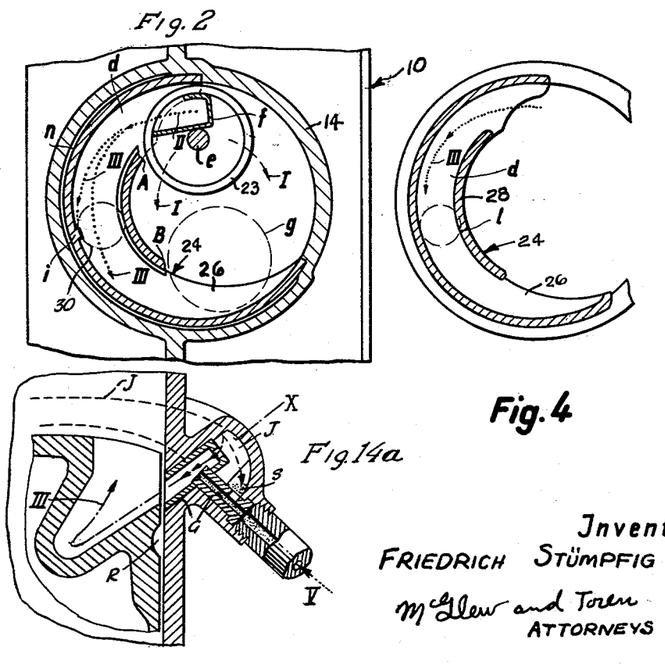
FIG. 2 is a section taken on the line 2—2 of FIG. 1.
FIG. 4 is a section taken on the line 4—4 of FIG. 3.
FIG. 14a shows the fuel inlet of FIG. 14 on a larger scale.

In accordance with the invention, the head 14 and the cylinder 12 are machined at their mating ends to provide annular supporting ledges for members which comprise a semi-annular pocket member generally designated 24. The pocket member 24 forms a vaporization chamber $d$ at the top of the cylinder 12 in the head 14. The pocket member 24 advantageously includes complementary plate members including a lower flat, semi-annular plate 26 and an upper plate which is curved around the walls of the cylinder head 28 and thence downwardly. The overall pocket member 24 is substantially C-shaped in section, between the curved area A, B as indicated in FIG. 2. The space on each end of the curved area is opened to the main cylinder. The separation between the plates 26 and 28 along the line A, B forms an opening *m* communicating the main cylinder with the vaporization chamber or evaporation chamber *d*.

In the embodiment shown, a piston generally designated *a* is provided with a semi-annular cutout portion complementary to and vertically aligned with the pocket member 24. A vertical semi-annular wall 29 thereof is adapted to move upwardly to block all or a portion of the opening *m* during the upward movement of the cylinder during compression.

The fuel air mixture which comes in through the conduit *z* and is deflected by a deviation element or baffle *f* located at the lower portion of a cylinder conduit 23 so that the fuel-rich mixture is directed against the interior walls of the pocket member 24. The baffle or deflecting member *f* is rigidly connected with the inlet valve *e*.

In FIGS. 1 to 4 there is illustrated a four stroke cycle engine in which the interior of the pocket-shaped member 24 forms an evaporation chamber *d*. Fuel which is delivered through the conduit *z* is deflected by the baffle member or deviation element *f* against the interior walls of the pocket members 24. During the downward movement of the piston, generally designated *a*, i.e. during the suction stroke, air is aspired in the direction of arrow I downward into the interior of the cylinder and a fuel and air mixture which has been formed in the carburetor portion *o* is guided through the conduit *z* and by the deviation element *f* in the direction of arrow II into the pocket-shaped evaporation chamber *d*.

This mixture moves within the evaporation chamber and advances along the curved, outer evaporation chamber wall during operation in the direction of arrow III and is then deviated around the entrance or opening of the evaporation chamber *m*. As the evaportion chamber wall is not water cooled, the wall is hot during operation.

During this procedure the fuel drops contained in the aforesaid mixture are centrifuged or hurled against the wall of the evaporation chamber and are distributed over a large area thereof and deposited thereon, so that during the suction stroke large fuel drops are prevented from entering the chamber or interior of the cylinder.

Upon closing of the inlet valve *e* and in the course of the compression stroke the air from the cylinder space is compressed partly in the evaporation chamber *d* and partly outside of the latter in air compression chamber *h*. On account of this occurrence an eddying or transverse whirling effect takes place in the evaporation chamber in the direction of arrow IV, which causes mixing of air and the fuel, which meanwhile has to a large extent evaporated on the hot wall of the evaporation chamber. Before completion of the compression stroke and before ignition the piston with its elevated bottom part approaches the vicinity of the cover of the cylinder head. This effectuates the closure or partial closure of the opening *m* of the evaporation chamber along line A–B without, however, breaking the connection between the air compression chamber *h* and the two ends of the evaporation chamber space.

Consequently, the direct air supply to a spark plug 30 (shown only in dotted lines in FIG. 2) prior to the ignition is greatly throttle and nearly avoided.

It is for this reason that the fuel vapor which is formed in the evaporation chamber before ignition, is pushed or urged toward the ignition means or spark plug 30 (FIG. 2) so that at the instant of ignition, just prior to the termination of the compression stroke, there is still present a rapidly ignitable mixture at the spark plug location, which mixture lends itself for complete combustion. This also holds true if the engine is operated with excess of air, e.g. if it is not operated at full capacity.

Thus, the fuel consumption is greatly reduced and the formation of poisonous carbon monoxide usually formed in the exhaust gases is markedly reduced, while near the spark plug a vigorous and strong flow of ignitable mixture is produced.

This very hot fire stream emanating from the location of the spark plug rapidly flows from the vaporization chamber *d* into the air compression space *h* when the piston is still in the upper position. At this time, the piston still closes to a certain extent the opening of the vaporization chamber *m* along the length A–B, so that the fire stream is forced to pass through the two ends of the vaporization chamber *d* into the air compression space *h*. For this reason the fire stream is forced to flow through the vaporization chamber toward both ends of the same in a relatively thin layer formation, i.e., at great speed. Due to this hot fire stream, the wall of the vaporization chamber will be heated up sufficiently even at reduced engine output to cause evaporation of a quantity of fuel which is sufficient for carrying out the ignition.

Further, the hot fire stream causes acceleration of the vaporization of any fuel deposited or present in the vaporization chamber as well as intimate mixing of the burning mixture blowing out of the vaporization chamber and of the air which has been compressed in the air compression chamber. This acceleration is so strong that the engine may be operated at full engine output at high speed and with large fuel supply and nevertheless liquid fuel of low, as well as of very high boiling point, will be completely burned at the right moment. The formation of a mixture which is too rich with fuel for effecting proper ignition is avoided even at very high engine load, because greater quantities of fuel are then deposited in the vaporization chamber whereby the latter will be cooled.

Instead of spark plug ignition, self-ignition may be had at higher compression. In such case the ignition causes the formation of a strong fire stream in the center part of the vaporization chamber, which results approximately in the same advantages as obtained by spark plug ignition.

In order to bring about formation of an ignitable mix near the spark plug 30, it is advantageous to provide on the vaporization chamber wall and close to the ignition spark plug a low projection in form of a rib or ledge *i*, as thereby at this location the fuel is deposited and evaporated to a greater extent. This in turn increases and facilitates the density of the fuel vapor at the spark plug.

After the piston has moved from its upper position downwardly to a certain extent, then the opening *m* of the vaporization chamber is again completely unblocked. Therefore, the vaporization chamber does not cause any significant gas throttling.

The expulsion of the burnt gases takes place on the exhaust stroke through the exhaust valve *g* in the usual manner.

The method of carrying out the invention can be modified in various particulars and carried out in very different ways, as will be illustrated in the following examples.

The vaporization chamber *d*, shown in FIGS. 3 and 4, for a four-stroke internal combustion engine, has a tube-shaped cross-section in its central part. This form can be used if desired in place of the form of evaporation chamber *d* shown in FIGS. 1 and 2. For the purpose of easy construction, it is likewise formed of an upper part and a lower part. It is preferable to embed this vaporization chamber deeply upwards in the material of the cylinder head, so that a large upward projection of the piston crown is unnecessary. The position of the spark plug is indicated in FIG. 4 by the dotted circle *l*. The method of operation and the advantages achieved with an engine constructed in this way are substantially the same as with the engine of FIGS. 1 and 2.

Figure 5:
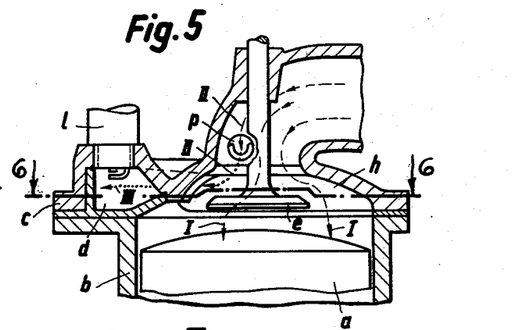
FIG. 5 is a transverse section similar to FIG. 1 of another embodiment of the invention.
Figure 6:
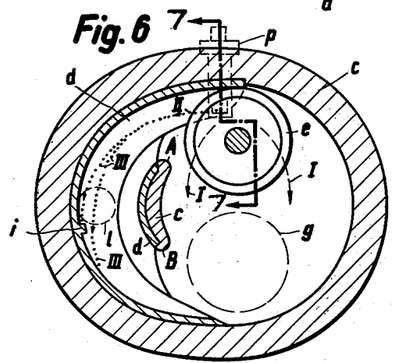
FIG. 6 is a section taken on the line 6—6 of FIG. 5.
Figure 7:
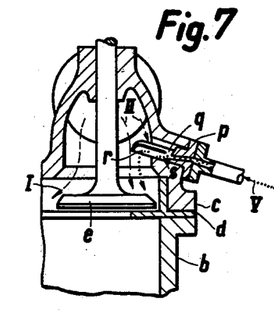
FIG. 7 is a section taken on the line 7—7 of FIG. 6.

In the four-stroke internal combustion engine of FIGS. 5, 6 and 7, the pocket-shaped vaporization chamber *d* is again arranged in the cylinder head but extends further sidewards outside the cylinder bore. The opening of inlet valve *e* at one point nearly touches the inside wall of the cylinder head. As a result, during the suction stroke with the inlet valve *e* open, the main part of the air is sucked directly into the cylinder space in the direction of the arrows I, and a small part of the air is sucked into the vaporization chamber *d* in the direction of the arrows II.

By means of a fuel supply device to which later on reference is made, fuel will be added principally in drop formation to the last mentioned air part, which carries such fuel drops into the vaporization chamber and advances them in the direction of arrow III, whereby the fuel drops are hurled or forced against the curved outer wall of the vaporization chamber which is very hot. The fuel drops in the form of a fine film-like layer evaporate then on this wall of the vaporization chamber.

Between the axis of the cylinder and the ignition spark plug 30, the cylinder head has a downwardly directed rim and the vaporization chamber possesses an upwardly directed wall section, which together separate the vaporization chamber *d* along line A, B from the air compression space *h*. At the two ends of the compression chamber *d* there remains, however, a connecting or communication opening which leads to the air compression space *h*. Thus, a direct air access to the spark plug 30 is prevented and the fuel vapor formed prior to the ignition in the vaporization chamber is pushed ahead principally toward the spark plug 30. For this reason, the mix formation and the combustion course proceed in a similar manner, as in the vaporization chambers according to FIGS. 1 and 2 and also FIGS. 3 and 4.

If according to FIGS. 5 and 6, in which similar parts are similarly designated, the air suction line is disposed ahead of the inlet valve *e* so that the flow or stream of air is approximately directed in the same direction as the air inlet stream into the vaporization chamber, then during the suction or aspiration stroke in the cylinder head there is created a circulating air flow, which ensures the supply and deposit of fuel in the vaporization chamber.

Figure 8:
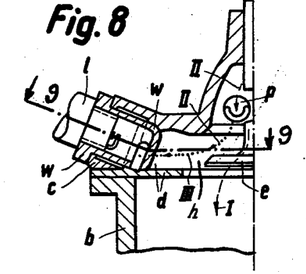
FIG. 8 is a fragmentary transverse section of still another embodiment of the invention and taken on the line 8—8 of FIG. 9.
Figure 9:
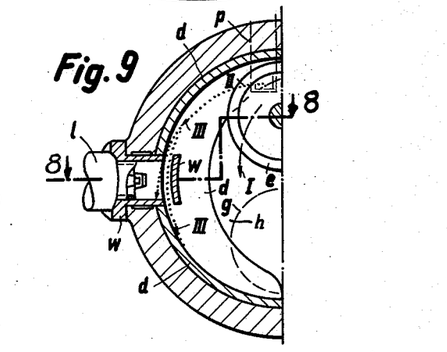
FIG. 9 is a section taken on the line 9—9 of FIG. 8.

FIGS. 8 and 9 show an evaporation chamber *d* which with its entire height is open toward the cylinder axis. The chamber is pocket-shaped and is located within the cylinder head *c*. In a combustion engine which is equipped with such evaporation chamber the main portion of the air during the suction stroke and with open inlet valve *e* is sucked in the direction of arrow I into the cylinder space and the remainder of the air is sucked in the direction of arrow II into the vaporization chamber *d*. In doing so, the fuel is mixed to the last mentioned air portion and this is done by means of a fuel supply device *p* in a manner as will be explained later on. This air portion forces the fuel into the vaporization chamber *d* and moves the same in the direction of arrow III further on so that the fuel will be deposited partially onto the hot wall of the evaporation chamber and partly in the also very hot ante-chamber for the spark plug which later chamber is called the spark plug sleeve *w*. During the subsequent compression stroke, the piston presses the air from the cylinder space partly into the air compression space which is located in the cylinder head and which is not shown, and partly into the evaporation chamber and into the sleeve *w*. The fuel in the sleeve which at this stage is already partially vaporized is together with the air advanced towards the spark plug 30 in the form of a fuel-air mixture and toward the end of the compression stroke, the mixture is then ignited by means of the spark plug. As a consequence thereof, at the upper piston position a burning mixture flows out from the spark plug sleeve towards two sides in a relatively thin layer formation and with very rapid speed and in the form of a fire stream moves above any fuel which may still be deposited on the evaporation chamber wall into the air compression space. In such manner extraneous ignition is insured during the working with air excess at partial output of the engine and, furthermore, a complete and timely evaporation of larger quantities of deposited fuel and an intimate mixing of the burning mixture with the air in the air compression space is obtained. Moreover, the mentioned scavenging of the evaporation chamber is accomplished, because a highly compressed gas cushion is formed in the sleeve *w*. Therebeyond, gas throttling in the and by the evaporation chamber is practically completely avoided as the evaporation chamber in its entire height and width may be permanently open toward the air compression space. The piston may have the same shape and configuration as the piston *a* shown in FIG. 5.

Figure 10:
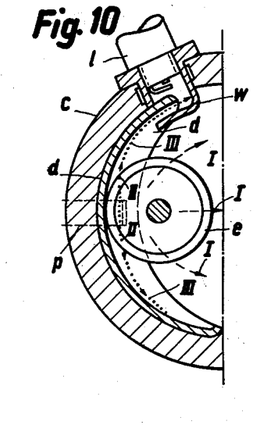
FIG. 10 is a fragmentary transverse section of still another embodiment of the invention.

Similar advantages ensue from an evaporation chamber *d* which is shown in FIG. 10 in cross section. An axial section through this embodiment corresponds to FIG. 7 if the same is symmetrically inverted from the right to the left. In this case also a spark plug space or sleeve *w* is employed in the same manner for the evaporation of the fuel. If a evaporation chamber of this kind is employed and at open inlet valve *e*, the main portion of the air is sucked in the direction of arrow I into the cylinder space which is located below the inlet valve *e* while a smaller part of the air is sucked in the direction of arrow II into the evaporation chamber *d*. The fuel is then admixed by means of a special fuel injection or fuel supply device *p* into the air streams flowing in accordance with the arrows II which air streams then move the fuel in the direction of arrow III into the evaporation chamber where the fuel is partly deposited on the hot wall of the very hot evaporation chamber and partly within the hot space or sleeve *w*. During the compression stroke, the fuel evaporating in sleeve *w* is also pushed toward the spark plug 30 and after its ignition by the spark plug 30 is ejected in the form of a burning mixture from one side of the spark plug sleeve *w* and in a relatively thin layer formation and with extremely great speed flows above the fuel which may still be deposited on the evaporation chamber wall.

If the spark plug sleeve or ante-chamber is made sufficiently large, the sleeve or ante-chamber may serve as sole evaporation chamber. The arcuate wall of the evaporation chamber *d*, as seen in section in FIG. 10, may then be dispensed with. In such case the complete fuel quantity or only the larger fuel drops are introduced into the spark plug sleeve or ante-chamber. In the last case, the fuel which is outside of the pre-chamber is then evaporated and ignited by means of the fire stream which flows after the ignition from the ante-chamber.

It is of advantage for the inventive method if the admixture of the fuel to be introduced into the evaporation chamber with gas or air flowing into the evaporation chamber is accomplished just outside or within the evaporation chamber. This may be accomplished by means of a fuel injection pump or, in a preferred embodiment, in a novel manner to be explained hereinbelow. An embodiment of this procedure is illustrated in FIGS. 5, 6 and 7. In this embodiment, the fuel is admixed with the air flowing into the evaporation chamber at a position directly in front of the seat of the inlet valve *e*. This means that the fuel is admixed with the air flowing in the arrow direction II at a location before it reaches the evaporation chamber *d*. For this purpose, the fuel to be supplied into the evaporation chamber is continuously advanced in the direction of arrow V into the fuel supply device *p*. Within this device *p*, that is within the fuel storage space *s*, the fuel is stored until the next opening of the inlet valve *e* takes place. A rising mixing pipe *r* is arranged between the fuel storage space *s* and the air suction line. The pipe *r* opens into the air suction line just in front of the seat of the inlet valve substantially in direction of the air flow II. In addition, between the fuel storage space $s$ and the air suction line, there is also arranged a rising air channel $q$ which opens into the air suction line substantially opposite to the direction of the air flow II. As soon as the inlet valve $e$ has been opened for the suction stroke and air is thus sucked in the direction of the arrows I and II, a portion of this air is ejected through the air channel $q$ into the fuel storage space $s$ while another portion of the air flows downwardly past the mouth of the mixing pipe $r$ and causes sub-atmospheric pressure conditions in the latter. These phenomena cause that during the suction stroke, the fuel which is present in the fuel storage space $s$ is blown out from the mixing pipe $r$ downwardly and is admixed with the air portion which flows into the evaporation chamber.

The result of this fuel introduction is that no deposit of fuel can take place in the suction line and for this reason the disadvantages connected with such deposit, and previously explained, do not occur. This is so because the fuel is brought to the vicinity of the evaporation chamber in non-atomized condition. Further, this manner of supplying the fuel prevents escape of non-vaporized fuel from the evaporation chamber into the cylinder space because the fuel supply device divides the fuel substantially into only large sized fuel drops which, during the deflection within the evaporation chamber, are deposited on the wall thereof. In this manner, complete fuel evaporation is accomplished and wear of the engine is drastically reduced, particularly during start-up in the cold. Further, an increase in the compression during extraneous ignition is achieved and the employment of inexpensive lead-free fuels of low octane number is rendered possible. These cheaper fuels burn without difficulty and in knock-free manner with extremely high compression and the occurrence of lead compounds in the exhaust gases is prevented.

Figures 11, 11A, 12, 12A, 13, 16, 17:
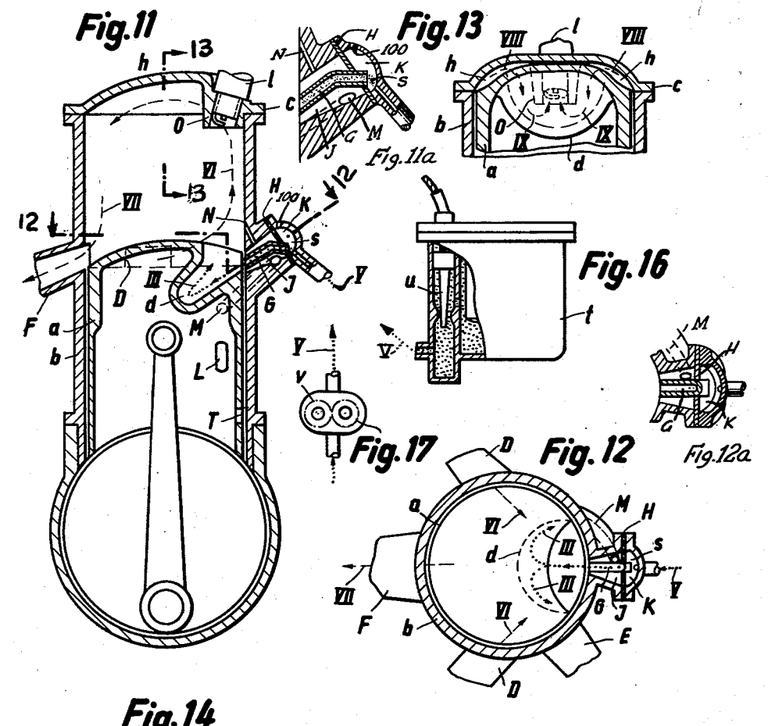
FIG. 11 is a transverse section of a two stroke cycle engine constructed in accordance with the invention.
FIG. 11a shows a portion of FIG. 11 on a larger scale.
FIG. 12 is a section taken on the line 12—12 of FIG. 11.
FIG. 12a shows a portion of FIG. 12 on a larger scale.
FIG. 13 is a section taken on the line 13—13 of FIG. 11.
FIG. 16 is an elevation partly in section of a float housing with a fuel control arrangement with the engine indicated in FIG. 11.
FIG. 17 is a side elevation of a pump for use in supplying fuel to the embodiment indicated in FIG. 11.

In the event that the connecting opening between the fuel storage space $s$ and the air channel $q$ is maintained very small, then due to the subatmospheric pressure conditions occurring in the mixing pipe $r$, a suction of the fuel in the storage space $s$ takes place in such a manner that also after completion of the suction stroke, fuel will still flow into the storage space $s$. For this type of fuel introduction which can be very simply constructed in engines with one or two cylinders or with a fuel tank which is situated at a high level, the required fuel can be supplied from a float comprising casing or tank $t$, as shown in FIG. 16. The fuel distribution may be constant, due to the up and down movement of the conical nozzle needle $u$ and the fuel level in the float casing can be maintained at the level of the highest fuel level in the storage space $s$. If desired, this level can be maintained at a lower position as well.

For the purpose of supplying the fuel into multicylinder engines, that is, into several fuel supply means, it is recommended to use a pump which is driven by the engine shaft. Such a pump is, for example, embodied by the pump $v$ of FIG. 17, which constantly feeds the required fuel quantity under a slight pressure of about 0.5 to 0.8 kg./cm.$^2$ into the storage space $s$ of each of the fuel supply devices. In this manner, a uniform distribution of the fuel to all cylinders is achieved, and this also holds true if the individual cylinders are arranged at different levels. The pump referred to may, at the same time, serve as the ordinary tank pump and can withdraw the fuel from a fuel tank situated at low level.

In the event that the inventive method is used in two-stroke cycle combustion engines, then the arrangement of the evaporation chamber within the piston is advantageous. This, in turn, requires a different arrangement for the fuel-supply device. FIGS. 11 through 15 illustrate two embodiments in this connection.

In each of these embodiments, the piston $a$ which reciprocates up and down within the cylinder comprises the pocket-shaped evaporation chamber $d$. For the scavenging of the cylinders, a hollow piston or plunger is used in known manner as a pump. At about the completion of the upward stroke of the piston, that is at the end of the compression stroke, air is sucked through the air suction line E in the lower part of the cylinder $b$ and in the crank case, which air subsequently, during the downward stroke of the piston, that is during the working stroke, is compressed in the crank casing and in the cavity of the piston. This air at about the lowermost piston position flows over the overflow channels D in the arrow directions VI into the upper cylinder space and displaces the fuel vapors contained therein into the exhaust pipe F in direction of the arrow VII. The fuel also supplied in arrow direction V into the fuel storage space $s$ which, in one- and two-cylinder machines with fuel tank in high position, can be accomplished under the employment of a float casing according to FIG. 16. In multi-cylinder machines wherein the fuel tank is in a low position, the use of a fuel pump, for example a gear pump as shown in FIG. 17, is more advisable. In the lowermost piston position, which is shown in FIGS. 11, 12, 14 and 15, the fuel is withdrawn from the storage space $s$ and blown into the evaporation chamber $d$. The storage spaces may be combined with auxiliary spaces K or J as referred to hereinafter, thereby forming the lowest fuel containing portion of the respective total spaces.

For the purpose of accomplishing this introduction of the fuel into the evaporation chamber, there is provided the pipe G between the fuel supply space $s$ and the cylinder space, with pipe G rises at the storage space. This pipe G is used in the two-stroke cycle combustion engine according to FIGS. 11, 12 and 13. The pipe G which in the lowermost piston position opens up into the evaporation chamber opening, is rigidly connected at the separating wall H. In the upper portion of the separating wall H there is provided an opening (not shown) which connects the auxiliary space J, which surrounds the mixing pipe G, with the auxiliary space K which is provided above the storage space $s$. The two auxiliary spaces are connected with the inner space of the crank casing pump. This is accomplished by the air channel M and the piston window or opening L, or by a single air channel. This connection causes that during the piston upward movement there will prevail subatmospheric air conditions in the auxiliary spaces J and K and also in the storare space $s$, while excess pressure will be created during the piston downward movement. Due to the subatmospheric conditions, the fuel necessary for the working stroke is sucked in direction of the arrow V into the storage space $s$ during the piston upward movement and this fuel is then blown at about the completion of the piston downward movement into the evaporation chamber. This blowing procedure is caused by the air excess pressure and the fuel is blown together with the air. Within the evaporation chamber, a deflection of the gas flow and of the fuel takes place in the arrow direction III which causes deposition of the fuel on the hot evaporation chamber wall and the fuel subsequently evaporates. This has the great advantages that in a two-stroke cycle combustion engine, no fuel can escape into the exhaust pipe F during the cylinder scavenging. Further, the fuel will evaporate prior to combustion and is thereby decomposed into its molecules. This, of course, means that the fuel is in a state wherein it has its most favorable combustion conditions and due to this fuel evaporation, liquid fuel of any kind can be used.

During the compression stroke, the air which during the scavanging procedure has remained in the cylinder space is compressed partly in the evaporation chamber $d$ and partly outside the same within the air compression space $h$. In doing so, and prior to the completion of the compression stroke and prior to the ignition, the plug O which is arranged in the cylinder head dips into the evaporation chamber opening as shown in FIG. 13. Due to the fact that just prior to ignition the air can only flow into the evaporation chamber in the arrow direction VIII, the fuel which in the meantime has partly evaporated within the evaporation chamber is pushed towards the spark plug 30 predominantly in the arrow direction IX. For this reason, an ignitable mixture is formed at the spark plug location even if the engine is operated with an air excess in order to keep the fuel consumption particularly low and in order to prevent formation of poisonous carbon monoxide gases in the exhaust gases. After ignition of the fuel by the spark plug 30, burning mixture flows already at the upper piston position with great speed in the form of a fire stream from the evaporation chamber $d$ and in a direction opposite to the arrow directions IX and VIII into the air compression space $h$. In doing so, this fire stream has to flow above any fuel which may still be deposited on the evaporation chamber wall. For this reason, and also at high engine speed and great combustion chamber load, a timely and complete evaporation of the fuel as well as an intimate mixing of the burning mixture with the compressed air which has been compressed in the air compression space $h$ is accomplished. In order to scavenge or remove the burning mixture from the evaporation chamber after ignition, a correspondingly large spark plug cavity or another space may be arranged as has been explained in connection with the inventive four-stroke cycle combustion engine.

The remaining portion of the working stroke takes place in the usual manner.

The sucking in of the fuel into the storage space $s$ may be improved by the arrangement of a piston window or opening T which, in the upper piston position, connects the inner space of the crank case pump with the mixing pipe G and the auxiliary spaces J and K. For the purpose of preventing a return movement of fuel from the space $s$ into the float casing in the event that a float casing $t$ as in FIG. 16 is used, it is recommended to arrange a valve between the storage space and the float casing. The valve may have any desired construction and has therefore not been illustrated in detail. However, the employment of the float casing is also possible without such valve in the event that the auxiliary space J is connected not with the auxiliary space K but through the bore N with the cylinder space, and the auxiliary space K has a narrow bore 100 which opens up into the ambient atmosphere. In that case, the auxiliary space J, during the piston downward movement, is first filled with pre-compressed air from the inner space of the crank case pump and subsequently is filled with fuel gases from the cylinder space. This causes that in the lower piston position, a small portion of the contents of the auxiliary space J flows back into the cylinder space while the larger portion of this content blows out along the mixing pipe G and into the evaporation chamber and thereby causes subatmospheric conditions in the mixing pipe G. These subatmospheric conditions cause that the fuel is sucked from the float casing T into the storage space $s$ while a small amount of air is sucked through the bore 100 into the auxiliary space K. Thereafter, the fuel and the air in the form of a mixture flow through the pipe G and enter, together with the larger portion of the contents of the auxiliary space J, the evaporation chamber $d$ in which the further advance of the mixture in the direction of the arrows III takes place.

Figures 14, 15:
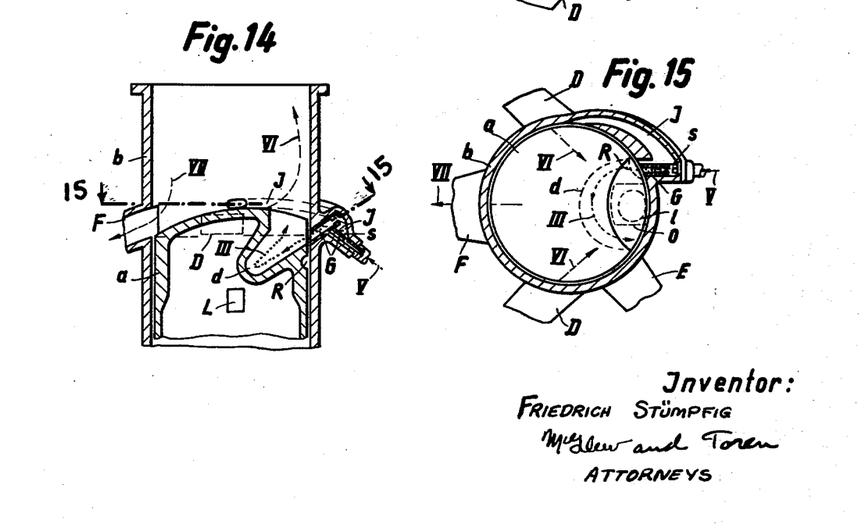
FIG. 14 is a fragmentary transverse section similar to FIG. 11 but indicating a different fuel feed means leading it to the vaporization chamber.
FIG. 15 is a section taken on the line 15—15 of FIG. 14.

FIGURES 14 and 15 show fragmentarily a two-stroke cycle combustion engine. In this engine, for the purpose of supplying the fuel into the fuel storage space $s$, a continuously pumping fuel pump is used while for the introduction of the fuel into the evaporation chamber $d$, compressed air is employed. For this purpose, there is arranged at the cylinder an oblong auxiliary space J, one end of which opens from above into the fuel storage space $s$ while at the other end and above the air channel D, it has an opening into the cylinder space. The last-mentioned opening, during the latter half of the piston downward movement, is first connected by the piston window or opening L, which is provided in the piston jacket, with the inner space of the crank casing pump and thereafter during continuous piston downward movement and prior to the scavenging of the cylinder, is connected with the combustion space within the cylinder. In doing so, pre-compressed air is first inserted from the crank casing pump into the auxiliary space J while subsequently fuel gases under pressure are supplied from the combustion space of the cylinder into the auxiliary space J. This causes that at the lowermost piston position and during the cylinder scavenging, the pre-compressed air in the auxiliary space J blows the fuel in the storage space $s$ with strong force and pressure through the mixing pipe G and into the evaporation chamber $d$, where the fuel advances in the arrow direction III and in doing so, the fuel deposits on the wall of the evaporation chamber and evaporates thereon. At the same time, with the fuel introduction into the evaporation chamber, the fuel gases which are present in the auxiliary space J flow again through the opening in the cylinder wall into the cylinder space and from there into the exhaust line F. The remaining working procedure and the advantages obtained are the same as in the engine of FIGS. 11, 12 and 13, because also in this instance and during the upper piston position, a plug O which is arranged in the cylinder head dips together with the spark plug 1 into the evaporation chamber opening as is shown in dash lines in FIG. 15.

In all the fuel supply devices which have been described hereinabove for use in two-stroke cycle engines, the piston groove R as shown in FIGS. 14 and 15 may be used. This groove or channel permits the flow of a small amount of compressed air before and after each fuel introduction procedure into the evaporation chamber from the auxiliary space J into the exit opening of the mixing pipe G. In this manner, any deposition of fuel on the rapidly moving piston is prevented.

The novel fuel supply devices of this invention are useable in engines with self-ignition caused by high compression.

Thus, the invention provides an improved engine cylinder and piston construction means for operating internal combustion engines. Due to the invention, there are created for the first time all the pre-requisites for effecting combustion, even at high engine speeds and with the use of a variety of fuel types. The engine insures that there is always a complete vaporization of the fuel to prevent any ignition failures. The invention makes it possible to obtain complete vaporization and ignition even if the engine is operating at partial load and output, at which time the mixture is not so rich with fuel and an excess of air is available. As a consequence of the invention, the engine output is increased, the fuel consumption is greatly reduced and the fuel cost is diminished. The carbon monoxide content of the exhaust gases is minimized and it is now possible to use fuels with the engine which are not inflammable under normal handling conditions. In addition, fuel types may be employed which have either a high or a low boiling point.

For the purpose of avoiding further drawbacks of known engines which work under the principle of fuel vaporization, the process according to the present invention is applicable through certain other additional steps. To this end a novel fuel feeding system has been provided for the vaporization chamber which prevents the escape of fuel which is not vaporized into the cylinder space. In a multi-cylinder engine setup, uniform distribution of fuel into the various cylinders may be assured while a fuel mixture suction pipe, which in previous constructions had to be heated, can now be eliminated.

The invention also provides a feature directed to the operational step of scavenging the vaporization chamber after the ignition has taken place so that all fuel particles will meet and be admitted with the required air for combustion.

While specific embodiments of the invention have been shown and described in detail to illustrate the application of the invention principles, it will be understood that the invention may be embodied otherwise without departing from such principles.

What is claimed is:

1. In a method of operating an internal combustion engine of the kind wherein the engine includes a cylinder head piston construction defining a cylinder space, said cylinder space communicating
   (a) with an evaporation chamber having a hot wall during operation and
   (b) with an air compression space also communicating with said evaporation chamber
and wherein the major amount of combustion air is introduced into said cylinder space while fuel is injected into said evaporation chamber and deposited on the hot wall thereof to evaporate therefrom and wherein a minor portion of the combustion air in the cylinder space is thereafter compressed in the evaporation chamber while a major portion is compressed in the air compression space, whereafter towards the end of the compression the fuel-air mixture in the evaporation chamber is ignited at an ignition location, the improvement which comprises that the fuel vapor formed in the evaporation chamber prior to the ignition is urged and concentrated toward the ignition location in the evaporation chamber while access of pure air from said cylinder space and said compression space to said ignition location is substantially prevented at least at a time immediately prior to ignition and that the burning mixture formed upon ignition within the evaporation chamber is then ejected in the form of a thin layer and at great speed over the wall of said evaporation chamber and into said air compression space to cause evaporation and combustion of fuel particles deposited on said evaporation chamber wall.

2. The improvement of claim 1, wherein a heavy deposit of fuel is effected in the neighborhood of the ignition location.

3. The improvement of claim 1, wherein the fuel is supplied continuously and in unatomized condition to the neighborhood of an inlet member, is stored there in a fuel storage space up to the moment of fuel inlet and then at each opening of the inlet member is carried out of the fuel storage space into the evaporation chamber with a supply of air which is only a part of the total amount of air within the cylinder.

4. The improvement of claim 1, wherein a highly compressed cushion of gas is formed and compressed in a part of the compression space as a result of the increase in gas pressure arising from each ignition, and on the reduction of gas pressure the cushion of gas flows out of the said part of the compression space into the evaporation chamber and scavenges its contents into the air compression space and the cylinder space.

5. The improvement of claim 1, wherein the fuel is deposited and evaporated partly in the evaporation chamber and partly in a spark plug ante-chamber and is ignited and forms the fire stream in the latter.

6. The improvement of claim 1, wherein the fuel is deposited and evaporated for the most part only in a spark plug ante-chamber serving as sole evaporation chamber.

7. An internal combustion engine comprising in combination a cylinder defining a cylinder space, a piston reciprocatably mounted within said cylinder, an evaporation chamber communicating with the cylinder space and having an ignition location, means for introducing air into the cylinder space and means for introducing fuel into the evaporation chamber, the cylinder and piston co-operating so that on the compression stroke a part of the air in the cylinder space is compressed in the evaporation chamber and another substantial part is compressed in an air compression space communicating with the evaporation chamber, means for concentrating and urging fuel vapor formed up to the instant of ignition towards the ignition location in the avaporaton chamber, means for preventing access of pure air to the ignition location at least shortly before ignition, means for igniting the mixture of fuel vapor and air contained in the evaporation chamber at the end of the compression, whereby while the piston is in its uppermost position, burning mixture in the form of a fire stream is ejected in a thin layer and with great speed, passing over the main location of fuel deposit in the evaporation chamber out into the air compression space.

8. An engine according to claim 7, wherein the avaporation chamber is arched outwardly at its perimeter, the fuel introduced is guided against the arched wall of the evaporation chamber and a covering is provided which cuts off the ignition location from the air compression space, at least immediately before and after ignition.

9. An engine according to claim 7, wherein the evaporation chamber is arranged in the cylinder head and presents towards the cylinder axis a long narrow slit which, shortly before the ignition, is substantially closed over its length by the piston.

10. An engine according to claim 7 having electrode containing spark plugs wherein the evaporation chamber is arranged in the cylinder head and is open towards the cylinder axis over substantially its whole height, while from the outer side wall of the evaporation chamber two narrow, oppositely disposed openings communicate with a spark plug ante-chamber.

11. An engine according to claim 7 having electrode containing spark plugs, wherein the evaporation chamber is arranged in the cylinder head and is open towards the cylinder axis over substantially its whole height, a spark plug ante-chamber is arranged at one end of the outer side wall of the evaporation chamber, the said ante-chamber has an opening into the evaporation chamber.

12. An engine according to claim 7, wherein a spark plug ante-chamber alone acts as the evaporation chamber and is arranged in the cylinder head.

13. An engine according to claim 12, wherein the spark plug ante-chamber forms part of the spark plug itself.

14. An internal combustion engine comprising in combination a cylinder defining a cylinder space, a piston reciprocatably mounted within said cylinder, an evaporation chamber communicating with the cylinder space and having an ignition location, means for introducing air into the cylinder space and means for introducing fuel into the evaporation chamber, the cylinder and piston cooperating so that on the compression stroke a part of the air in the cylinder space is compressed in the evaporation chamber and another substantial part is compressed in an air compression space communicating with the evaporation chamber, means for concentrating and urging fuel vapor formed up to the instant of ignition towards the ignition location in the evaporation chamber, means for preventing access of pure air to the ignition location at least shortly before ignition, means for igniting the mixture of fuel vapor and air contained in the evaporation chamber at the end of the compression, whereby while the piston is in its uppermost position, burning mixture in the form of a fire stream is ejected in a thin layer and with great speed, passing over the main location of fuel deposit in the evaporation chamber out into the air compression space, said engine further comprising a projection on the outer side wall of the evaporation chamber near the ignition location and extending approximately transversely to the direction of movement of the fuel introduced into the evaporation chamber.

15. An engine according to claim 7, wherein the evaporation chamber is arranged in the piston and a lug is provided in the cylinder head which, in the uppermost position of the piston, enters partially into the evaporation chamber opening and carries a sparking plug.

16. An engine according to claim 7, wherein a space forming part of the total compression space is arranged to be in communication only with the evaporation chamber, at least at the instant of ignition and shortly thereafter.

17. An engine according to claim 7 for four-stroke cycle operation, with the evaporation chamber and an inlet valve in the cylinder head, wherein the opening of the inlet valve at one place approaches closely to the inside wall of the cylinder head and the fuel in the neighborhood of this place is entrained in the part of the air which flows into the evaporation chamber.

18. An engine according to claim 17, wherein the air inlet line is so arranged that the air flow therein and the air flow in the evaporation chamber follow substantially the same direction as seen in plan.

19. An engine according to claim 7 for four-stroke cycle operation, with the evaporation chamber in the cylinder head and with a fuel reservoir, wherein a short mixture tube, extending outwardly from a fuel reservoir, is arranged as a connecting duct between the fuel reservoir and the air inlet line, and the said mixture tube opens shortly upstream of the inlet valve seat approximately in the direction of the air flow in the air inlet line, while a further connecting duct leads from the fuel reservoir and opens into the air inlet line at a position situated higher up against the direction of the air flow.

20. An engine according to claim 19, wherein the said further connecting duct opens to the atmosphere at a position situated higher up.

21. An engine according to claim 7, for two-stroke cycle operation having a crank case pump for supplying scavenging air and a fuel reservoir, wherein a mixture tube extending outwardly from the fuel reservoir is arranged as a connecting duct between the fuel reservoir and the cylinder space, and the said mixture tube opens into the evaporation chamber opening at the lowermost position of the piston, while auxiliary spaces are arranged around the mixture tube and over the fuel reservoir at least one auxiliary space being in communication through a duct with the inside of the crank case pump.

22. An engine according to claim 7 for two-stroke cycle operation, with a crank case pump for supply of scavenging air, wherein an extended auxiliary space is arranged on the cylinder, opening at one end into the fuel reservoir from above and at its other end into the cylinder space somewhat above an air duct provided for cylinder scavenging, while an aperture is provided in the piston which puts the opening of the auxiliary space in the cylinder wall in communication with the interior of the piston, and cuts off this communication again before the upper surface of the piston clears the opening of the auxiliary space in the cylinder wall on downward movement of the piston.

23. A two-stroke engine according to claim 22, wherein a transverse groove is provided in the piston which puts the auxiliary space and the mixture tube in communication for a short time before the piston reaches its lowermost position and after it has left this position.

References Cited by the Examiner

UNITED STATES PATENTS

| 1,691,182 | 11/28 | Davol | 123—30 |
| 2,200,359 | 5/40 | Hellemn | 123—30 |
| 2,720,870 | 10/55 | Grob | 123—32 |
| 2,799,257 | 7/57 | Stumpfig | 123—30 |
| 3,015,321 | 1/62 | Stumpfig et al. | 123—30 |

FOREIGN PATENTS 683,162    11/52    Great Britain.

RICHARD B. WILKINSON, *Primary Examiner.*

KARL J. ALBRECHT, FRED E. ENGELTHALER,
*Examiners.*